US012594955B2

(12) United States Patent
Zhou et al.

(10) Patent No.: US 12,594,955 B2
(45) Date of Patent: Apr. 7, 2026

(54) AUTONOMOUS VEHICLE WITH FREESPACE PLANNER

(71) Applicant: GM Cruise Holdings LLC, San Francisco, CA (US)

(72) Inventors: Xiaoyu Zhou, San Francisco, CA (US); Shreyans Kushwaha, Sunnyvale, CA (US); Juan Fasola, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 181 days.

(21) Appl. No.: 18/482,304

(22) Filed: Oct. 6, 2023

(65) Prior Publication Data

US 2025/0115271 A1 Apr. 10, 2025

(51) Int. Cl.
*B60W 60/00* (2020.01)
(52) U.S. Cl.
CPC ....... *B60W 60/001* (2020.02); *B60W 2520/04* (2013.01); *B60W 2520/06* (2013.01); *B60W 2520/10* (2013.01); *B60W 2552/53* (2020.02)
(58) Field of Classification Search
None
See application file for complete search history.

(56) References Cited

U.S. PATENT DOCUMENTS

| | | | |
|---|---|---|---|
| 2024/0391495 A1* | 11/2024 | Nister | B60W 50/00 |
| 2025/0033661 A1* | 1/2025 | Wang | B62D 15/0285 |
| 2025/0050866 A1* | 2/2025 | Wang | B62D 15/0285 |

FOREIGN PATENT DOCUMENTS

| | | | | |
|---|---|---|---|---|
| WO | WO-2021102955 A1 * | 6/2021 | ......... | B62D 15/0285 |

OTHER PUBLICATIONS

English Translation of WO-2021102955-A1 (Year: 2021).*
Dolgov, Dmitri et al "Practical Search Techniques in Path Planning for Autonomous Driving," AAAI Workshop—Technical Report (2008), 6 pages; https://api.semanticscholar.org/CorpusID:16143233.
Liu, Li-Sang et al "Path Planning for Smart Car Based on Dijkastra Algorithm and Dynamic Window Approach," Wireless Communications and Mobile Computing, vol. 2021, Published Feb. 15, 2021 Article ID 8881684, https://doi.org/10.1155/2021/8881684, 12 pages.

(Continued)

*Primary Examiner* — Anshul Sood
(74) *Attorney, Agent, or Firm* — CANTOR COLBURN LLP

(57) ABSTRACT

Planning, or path finding is one of many tasks performed by an autonomous vehicle (AV). Planning involves searching for and updating an optimal plan from a current pose to an end pose while avoiding obstacles. Planning can be particularly challenging in driving scenarios involving complex driving maneuvers, such as parking, making a U-turn, making a K-turn, etc. Searching for an optimal plan may take more time, e.g., a few seconds, in certain driving scenarios. Consumers of the plan may have a low tolerance for delay in receiving the optimal plan. A relay can be implemented to publish the latest plan to the consumers at a frequency. The relay can check whether the delay violates a dynamic threshold and raise an error accordingly. The searching process can be improved to reduce the delay in finding an optimal plan.

18 Claims, 9 Drawing Sheets

(56)            References Cited

OTHER PUBLICATIONS

Zhang, Jing et al "Autonomous land vehicle path planning algorithm based on improved heuristic function of A-Star," International Journal of Advanced Robotic Systems, Sep.-Oct. 2021; 1-10, DOI: 10.1177/17298814211042730.

* cited by examiner

100

RECEIVE TIMESTAMPED PLANS <u>502</u>

STORE A LATEST TIMESTAMPED PLAN <u>504</u>

OUTPUT THE LATEST TIMESTAMPED PLAN AT A
FREQUENCY <u>506</u>

RECEIVE TIMESTAMPED PLANS 602

DETERMINE THAT A DIFFERENCE BETWEEN A TIMESTAMP OF A LATEST TIMESTAMPED PLAN CROSSES A THRESHOLD 604

RAISE AN ERROR 606

CAUSE A FALLBACK SYSTEM TO OUTPUT A PLAN TO THE VEHICLE CONTROLS THAT BRINGS THE VEHICLE TO A SAFE STOP 608

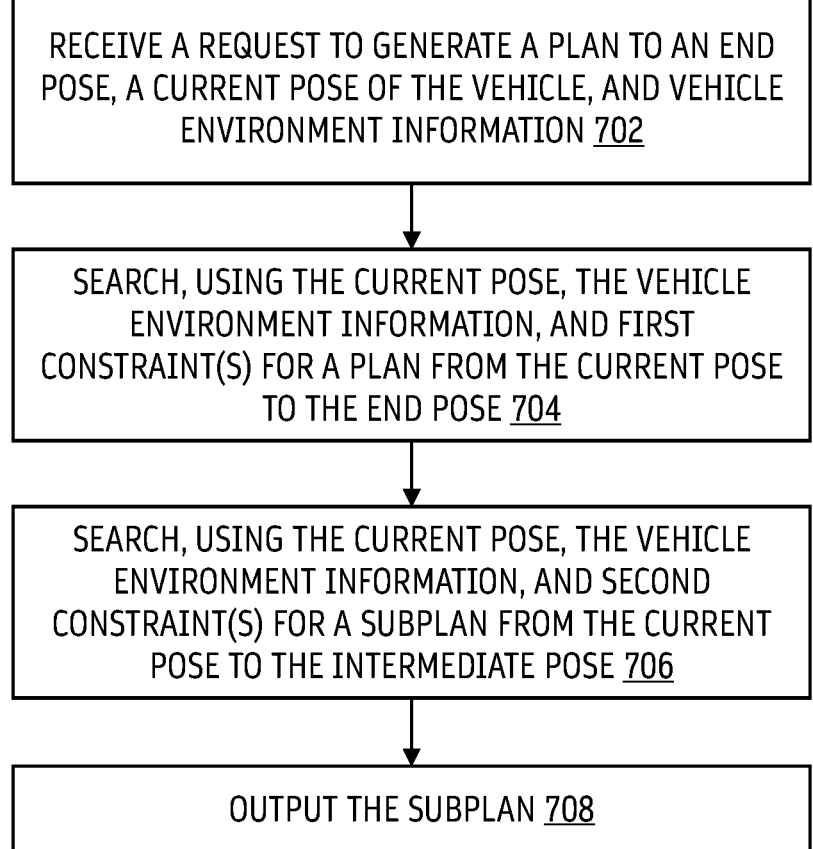

RECEIVE A REQUEST TO GENERATE A PLAN TO AN END POSE, A CURRENT POSE OF THE VEHICLE, AND VEHICLE ENVIRONMENT INFORMATION 702

SEARCH, USING THE CURRENT POSE, THE VEHICLE ENVIRONMENT INFORMATION, AND FIRST CONSTRAINT(S) FOR A PLAN FROM THE CURRENT POSE TO THE END POSE 704

SEARCH, USING THE CURRENT POSE, THE VEHICLE ENVIRONMENT INFORMATION, AND SECOND CONSTRAINT(S) FOR A SUBPLAN FROM THE CURRENT POSE TO THE INTERMEDIATE POSE 706

OUTPUT THE SUBPLAN 708

AUTONOMOUS VEHICLE WITH FREESPACE PLANNER

TECHNICAL FIELD

The present disclosure generally relates to autonomous vehicles and, more specifically, to remote relocation systems for autonomous vehicles (AVs).

BACKGROUND

AVs also known as self-driving cars, and driverless vehicles, may be vehicles that use multiple sensors to sense the environment and move without human input. Automation technology in autonomous vehicles may enable vehicles to drive on roadways and to perceive the vehicle's environment accurately and quickly, including obstacles, signs, and traffic lights. Autonomous technology may utilize geographical information and semantic objects (such as parking spots, lane boundaries, intersections, crosswalks, stop signs, and traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples.

Furthermore, the skilled artisan will appreciate the principles of the present technology as described and explained with additional specificity and detail through the use of the accompanying drawings in which:

FIG. 7 is a flow diagram illustrating another computer-implemented method performed by a freespace planner, according to some aspects of the disclosed technology.

DETAILED DESCRIPTION

Figure 1:
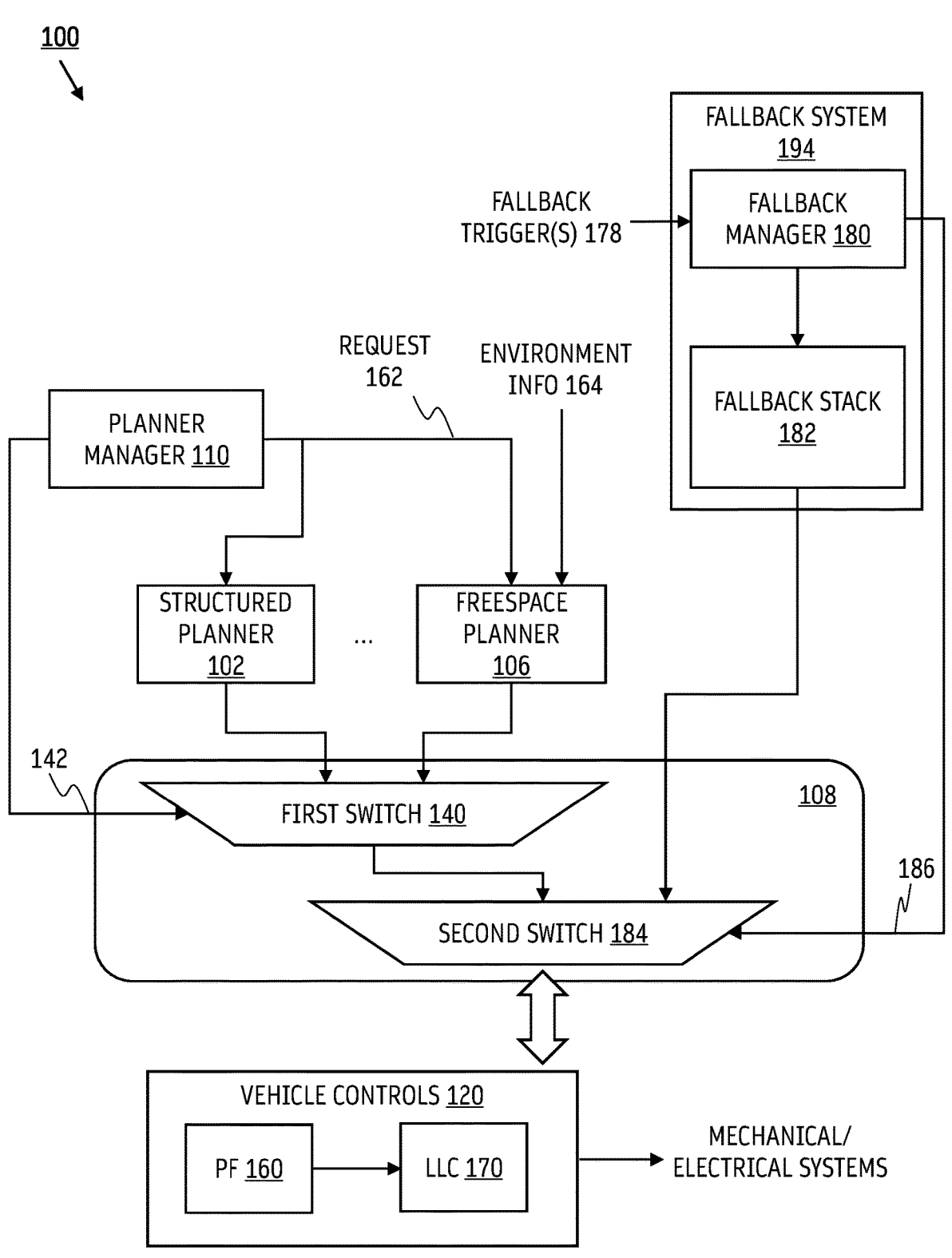
FIG. 1 illustrates an exemplary planning and control system for a vehicle, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

How an AV Navigates its Environment Using an AV Stack or Vehicle Control System

AVs can provide many benefits. For instance, AVs may have the potential to transform urban living by offering an opportunity for efficient, accessible, and affordable transportation. An AV may be equipped with various sensors to sense the environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from a current pose to an end pose). As part of planning, the AV may access map information and localize itself based on location information (e.g., from location sensors) and the map information. The AV may create plans based on map information, localization, data from perception, and data from prediction. Subsequently, plans can be sent to vehicle controls to control the AV (e.g., for steering, accelerating, decelerating, braking, changing vehicle lights, etc.) according to the plan.

In some cases, an AV may include one or more AV stacks implemented in the AV. An AV stack may be referred to as a vehicle control system of a vehicle. An AV stack can be used under a variety of conditions. An AV stack can be designed to operate under a specific condition, such as a degraded state of the AV. An AV stack may include an arrangement of components, stacks, or nodes to perform a variety of functions and produce outputs to cause the vehicle to navigate its environment, including controlling one or more vehicle actuators and/or one or more mechanical systems. Examples of nodes may include one or more perception nodes, one or more prediction nodes, one or more planning nodes, and one or more vehicle controls nodes. One or more perception nodes may generate tracked objects and inferences about the tracked objects in environment or surroundings of the AV. One or more prediction nodes may generate predictions of movement or kinematics of the tracked objects. One or more planning nodes may generate one or more plans and transmit the one or more plans to one or more vehicle controls nodes. One or more vehicle controls nodes can process a plan (e.g., instructions from the one or more planning nodes) and generate commands to one or more vehicle actuators to cause the vehicle to execute the plan (e.g., cause the vehicle to use appropriate vehicle signal lights, steer, drive/move, and follow the trajectory).

The operations of perception, prediction, planning, and control of an AV stack or a vehicle control system may be implemented using a combination of hardware and software components. For instance, an AV stack performing the perception, prediction, planning, and control may be implemented as software code or firmware code. The AV stack or a vehicle control system (the software and/or firmware code) may be executed on one or more processor(s). Examples of processors may include: general processors, central processing units (CPUs), graphical processing units (GPUs), machine learning processors, machine learning processors, neural network processors, artificial intelligence accelerators, artificial intelligence processors, tensor processing units (TPUs), data processing units (DPUs), digital signal processors (DSPs), application-specific integrated circuits (ASICs), microprocessors, field programmable gate arrays (FPGAs), electronic control units, etc. and/or any other hardware processing components on the AV. Additionally, the AV stack may communicate with various hardware components (e.g., on-board sensors and control system of the AV) over a network provided in the AV.

A plan may include a path or trajectory connecting the current pose to an end pose, and optional instructions to the vehicle controls for executing the plan. A plan can include several components, such as one or more trajectories, a target gear request, a blinker light request, a hazard light request, a braking request, and a honking request. A plan can include requests or instructions (e.g., software instructions) for vehicle controls in addition to one or more (reference) trajectories or paths. A trajectory can include a contiguous line that connects a starting point/pose of the vehicle and an end point/pose of the vehicle. The line may be defined within a two-dimensional representation of the driving surface or in a three-dimensional representation of the environment surrounding the vehicle. The line may have a corresponding length. Different portions or segments of the line may have different curvatures. The line may have an associated directionality. A trajectory may be multidimensional. Besides including a line, a trajectory may include higher order derivatives such as velocity, acceleration, curvature, curvature rate, etc. In some cases, a plan can include multiple segments or multiple parts. A segment of a plan can include a portion of the overall trajectory, and a subset of the various vehicle control requests (e.g., target gear request, blinker light request, hazard light request, braking request, and honking request) corresponding to the segment of the plan. A segment of a plan can be unidirectional (e.g., having a portion of the trajectory involving the AV going forward or reverse).

A pose may include a location or position of a vehicle. A pose may include an orientation or heading of a vehicle (e.g., a direction that the front of a vehicle is pointing to).

Overview

Planning, or path finding is one of many tasks performed by an AV. Planning involves searching for and updating an optimal plan from a current pose to an end pose while avoiding obstacles. An example of such planning is freespace planning. Planning can be particularly challenging in driving scenarios involving complex driving maneuvers, such as parking, unparking, making a U-turn, making a K-turn, etc. Planning can be challenging in other driving scenarios such as dense parking lots, tight parking structures, dense urban settings, highway driving, etc. In less challenging driving situations, planning can search for an optimal plan that involves the AV driving in one direction only, e.g., driving forward, to move the AV from a current pose to an end pose. Searching for a unidirectional optimal plan can be straightforward and fast, since the search space (e.g., graph) is more constrained. As the process walks through the search space, there are less options or possible cells to explore when the AV is constrained to drive forward or drive in reverse. However, when an AV is in a more complex driving scenario, getting from a current pose to an end pose may necessitate making a multi-point turn, and a bi-directional optimal plan would be needed to perform the driving maneuver. Searching for a bi-directional optimal plan can be more computationally intensive to complete, since the search space is larger and there may be fewer constraints or more relaxed constraints on where the AV can travel. As the process walks through the search space, there are more options and possible cells to explore when the AV is allowed (not constrained) to drive forward and drive in reverse. In certain driving scenarios, searching for an optimal plan involving driving in forward and in reverse may take more time, e.g., a few seconds.

Consumers of the plan, e.g., components downstream of the planner or planner node, such as vehicle controls, may expect a planner or planning node to refresh or publish updated plans at a certain frequency, e.g., 10 Hz. In some cases, consumers may have a low tolerance for delay in receiving the optimal plan. For example, a consumer of the plan may expect the planner or planning node to update the output plan with no more than 300-400 ms of delay. A planner that may take a few seconds to update an output plan may not be used directly with these consumers without taking the delay into account.

To address the delay, a relay can be implemented to publish the latest plan from the planner or planner node to the consumers at a certain frequency. The relay can tick at a frequency, e.g., 10 Hz. At each tick, the relay can relay, forward, and/or publish a latest available plan received or cached from the planner or planning node. The relay can also relay, forward and/or publish the latest available plan as soon as the relay receives the plan. The relay can guarantee that a plan is published at or above a minimum frequency or with less than a maximum tolerable delay.

Depending on a state of the AV and/or the environment or surroundings of the AV, a few seconds delay in updating an optimal plan may be acceptable. Whether the delay is acceptable or tolerable may depend on whether the AV is in a time-sensitive driving scenario. For example, if the AV is stationary, a few seconds delay in updating an optimal plan is tolerable. In another example, if the AV is in a parking structure and not on a public road, a few seconds delay in updating an optimal plan is tolerable. In some embodiments, the relay can monitor the delay. If the delay of the planner or planning node in updating an optimal plan crosses a threshold, the relay can raise an error. The error can cause the AV to enter a degraded state, and a fallback system can take over to gracefully bring the AV to a stop or a minimal risk condition. The threshold can be dynamic and can change based on whether the AV is in a time-sensitive driving scenario. The relay can check whether the delay violates a dynamic threshold and raise an error accordingly. The dynamic threshold can depend on one or more heuristics about the driving scenario, such as a current state of the AV and a current state of the environment or surroundings of the AV.

One other option to address the delay is to directly reduce the amount of time it takes for the planner or planning node to update the optimal plan. The searching process in the planner or planning node can be improved to reduce the delay in finding an optimal plan. The planner or planning node can first search for an optimal plan that involves the AV driving forward and in reverse. As discussed previously, this search may be computationally complex and can take some time to complete. The planner can determine one or more midpoints or intermediate poses in the optimal plan to divide the optimal plan into segments. An exemplary midpoint or intermediate pose may be where the AV changes gears to travel in an opposite direction, and exemplary segments may each involve the AV driving in a single direction (e.g., driving forward or driving in reverse). Rather than updating the entire optimal plan on following ticks, the planner or planning node can update or search for an optimal subplan from the current pose to the next intermediate pose. The search for the optimal subplan may involve exploring paths where is the AV driving in a single direction only. The optimal subplan may be shorter. The segment from the full optimal plan may be used as a seed to speed up the search. As a result, the search for the optimal subplan can be computationally efficient and fast.

Various embodiments herein and their advantages may apply to a wide range of vehicles (e.g., semi-autonomous vehicles, vehicles with driver-assist functionalities, etc.), and not just autonomous vehicles. Vehicles can include automobiles, buses, trucks, utility vehicles, construction/heavy machinery, ships, planes, helicopters, drones, trains, submarines, etc.

Exemplary Planning and Control System for a Vehicle

FIG. 1 illustrates an exemplary planning and control system 100 for a vehicle, according to some aspects of the disclosed technology. The planning and control system 100 may include one or more of: planner manager 110, one or more motion planners (e.g., structured planner 102, freespace planner 106, a planner designed to perform a certain task, etc.), a fallback system 194, a planner to controls interface 108, and vehicle controls 120.

Planner manager 110 may be included to manage the one or more motion planners. With different motion planners designed to perform different tasks, operate under different scenarios, or achieve different goals, planner manager 110 can manage the planners, e.g., structured planner 102, and freespace planner 106. Depending on the task, scenario, or goal, planner manager 110 can activate one of the motion planners to produce plans, e.g., by sending a request to a motion planner to generate a plan. For example, planner manager 110 may send a request 162 to generate a plan to freespace planner 106. Planner manager 110 may have information on a given task to be performed by the vehicle and instructs one of the planners to generate plans.

Structured planner 102 may be specialized in generating paths for the AV in structured, nominal driving (e.g., tasks or scenarios that involve the AV driving forward). Structured, nominal driving may involve path planning based on a detailed, lane-level map and detected objects of the AV's surroundings.

Freespace planner 106 may be specialized in generating paths for the AV in unstructured, freespace driving. Unstructured, freespace driving may involve collision-free and safe path planning based on sensor data and potentially without a detailed, lane-level map of the AV's surroundings. Freespace planner 106 may use a graph-based path planning or path finding algorithm to generate collision-free kinematically feasible paths. The algorithm used in freespace planner 106 may be different from the algorithm used in structured planner 102. Path planning in freespace planner 106 may find an optimal feasible path, based on one or more metrics. Path planning in freespace planner 106 may find the shortest feasible path. In some cases, path planning may in freespace planner 106 find the most comfortable feasible path. In some cases, path planning in freespace planner 106 may find the safest feasible path. Freespace planner 106 may generate paths without constraints such as remaining within lane lines, not driving on a curb, following traffic signals, abiding by structured rules in structured planner 102, etc.

Freespace planner 106 may receive environment information 164 for performing path planning. Environment information 164 may be generated by one or more of: one or more perception nodes, one or more prediction nodes. Environment information 164 may include an occupancy map generated by the one or more perception nodes. An occupancy map may include a (bird's eye view) pixel map including the vehicle, where a pixel may indicate whether a particular location is one of: (1) occupied by an object, (2) occluded, (3) free, and (4) unknown. Environment information 164 may include a motion map, which may include actual and/or predicted motion information corresponding to the pixels. Motion information may include an indication whether an object is moving or not. Motion information may include velocity vectors. Motion information may include past positions/locations of objects. Maps may represent information about a two-dimensional space of the environment (e.g., a bird's eye view). Maps may represent information about a three-dimensional space of the environment (e.g., a three-dimensional cube). Environment information 164 may include tracked objects information generated by one or more perception nodes, and one or more prediction nodes. Tracked objects information may include one or more of: points, polylines, bounding boxes, or polygons representing location, edges, and/or size of objects; velocity of objects, acceleration of objects, tracking age of objects, confidence level of information, classifications of objects, attributes of objects, motion models of objects, etc. In some cases, freespace planner 106 may receive semantic map information (e.g., including lane lines, intersections, etc.). Freespace planner 106 may receive information about the state of the vehicle, e.g., localization information including a current pose of the vehicle, current speed of the vehicle, current gear of the vehicle, etc.). Freespace planner 106 may receive traffic light information and/or right of way information generated by one or more perception nodes.

Yet another motion planner may be specialized in generating paths for the AV to drive in reverse. Yet a further motion planner may be specialized in producing instructions for tasks or scenarios that involve the AV staying still. Other planners may be specialized in generating paths for completing other tasks such as: parking, maneuvering around inside a building structure, pulling over, driving on a highway, driving on a freeway, driving offroad, driving in inclement weather conditions, etc.

All outputs of the motion planners may be coupled to the planner to controls interface 108. Plans (or other information associated with plans) generated by the motion planners are thus provided to the planner to controls interface 108. To output a plan from the motion planner that is active or in control, planner manager 110 may transmit a first selection signal 142 to a first switch 140 (or a first multiplexer) in planner to controls interface 108. The first selection signal 142 corresponds to the planner that is active or in control of the vehicle and allows the first switch 140 to select and output a plan generated by the planner that is active or in control of the vehicle. The first switch 140 may listen for the first selection signal 142 from the planner manager 110 to select an output (e.g., a plan) from the appropriate planner. Planner manager 110 may determine which planner is the appropriate planner to produce plans for the vehicle and generate the first selection signal 142 accordingly.

In some cases, one or more fallback systems, such as fallback system 194 having fallback manager 180 and fallback stack 182 may be implemented to take control of the vehicle when the vehicle is in a degraded state. Fallback stack 182 may include a fallback planner to generate an output plan. Degraded state of the vehicle can occur in scenarios where the vehicle is no longer expected to be fully operational. Such scenarios can occur if there is a software and/or hardware failure of the vehicle. Dependencies of fallback stack 182 in fallback system 194 may be orthogonal to dependencies of the motion planners controlled by planner manager 110 (e.g., structured planner 102 and freespace planner 106), and would take over control of the AV if the AV is in a degraded state. Fallback manager 180 may monitor for one or more degraded states, e.g., by checking for one or more fallback trigger 178. In some embodiments, fallback manager 180 may manage the fallback stack 182 and output a second selection signal 186 to a second switch 184 (or a second multiplexer). An output of the first switch 140 and an output of fallback stack 182 are coupled to inputs of the second switch 184. The second selection signal 186 may cause the second switch 184 to select one of the inputs to be provided as output of the second switch 184. The inputs to the second switch 184 may include an output plan from the first switch 140 and a plan generated by the fallback stack 182. If the fallback manager 180 determines that the vehicle is not in a degraded state, the second selection signal 186 may cause the second switch 184 to output the output plan from the first switch 140. If the fallback manager 180 determines that the vehicle is in a degraded state, the second selection signal 186 may cause the second switch 184 to output the output plan from the fallback stack 182. Effectively, the second selection signal 186 from the fallback manager 180 may dictate whether the fallback stack 182 is to control the vehicle. The fallback manager 180 may subscribe to one or more fallback triggers 178 that may indicate that the vehicle is in a degraded state. If one or more fallback triggers 178 is active, the fallback manager 180 may generate the second selection signal 186 accordingly. In some embodiments, there may be multiple fallback systems for different corresponding degraded states, e.g., each implemented to take over control of the AV when the AV is in a corresponding degraded state. The second switch 184 may receive paths from additional fallback systems and can select one of the output from the first switch 140 and one of the outputs of the fallback systems to be used, based on a second selection signal 186 from the fallback manager 180.

Vehicle controls 120 may receive an output plan from planner to controls interface 108 (e.g., from the second switch 184), and generate and output commands to the mechanical/electrical systems (e.g., vehicle actuators) to carry out the received output plan. Vehicle controls 120 may receive plans generated by the planners upstream of vehicle controls 120, and can generate (actuator) commands to control mechanical and/or electrical vehicle systems based on the received plans. Examples of mechanical and/or electrical vehicle systems of a vehicle controllable by vehicle controls 120 may include: vehicle gear control, vehicle blinker light control, vehicle hazard light control, vehicle steering control, vehicle brake control (which can include electronic parking brake control and/or wheel brake control), vehicle motor controls, and vehicle horn control. Vehicle controls 120 can send (actuator) commands to mechanical/electrical systems to cause a gear of a vehicle to change, cause the vehicle to brake, cause the vehicle to turn steering by a certain amount, cause the vehicle to accelerate by a certain amount, cause the horn of the vehicle to honk, etc. In some embodiments, vehicle controls 120 may include a path follower (PF) 160 and low-level controls (LLC) 170. Path follower 160 may generate a local path for the vehicle to take. The local path may be optimized based on position control error of the local path relative to a reference trajectory in the output plan received from planner to controls interface 108. The local path may include a corrective action to get the vehicle to converge on and stick to the reference trajectory of the received plan when the AV deviates from the reference trajectory. Path follower 160 may produce a local path that follows the reference trajectory of the received plan as closely as possible, given certain constraint(s). Constraints can include: comfort, speed, feasibility, lateral acceleration, curvature, curvature rate, lateral jerk, etc. Low-level controls 170 may generate commands, such as actuator commands, to the vehicle hardware controls based on the local path produced by path follower 160. For instance, low-level controls 170 may translate the local path into, e.g., engine torque, braking torque, steering wheel angle, transmission request, and electronic parking brake request for the vehicle hardware controls. Low-level controls 170 may determine desired gear, and produce gear control commands to change the gear of the vehicle. Low-level controls 170 may determine whether left/right blinker lights or hazard lights are to be turned on, and produce commands to turn on the left/right blinker lights or hazard lights.

Vehicle controls 120 may output feedback information about the vehicle controls 120 and/or mechanical/electrical systems to a planner, such as freespace planner 106. Feedback information may include position control error, current gear of the vehicle, current speed of the vehicle, etc. Position control error may indicate how far off is the actual/estimated position of the vehicle to a local path produced by a path follower or how far off is the actual/estimated position of the vehicle an expected position of the vehicle executing a set of commands. Feedback information may be considered a part of state information of the vehicle.

Exemplary Optimal Plan Produced by a Planner

Figure 2:
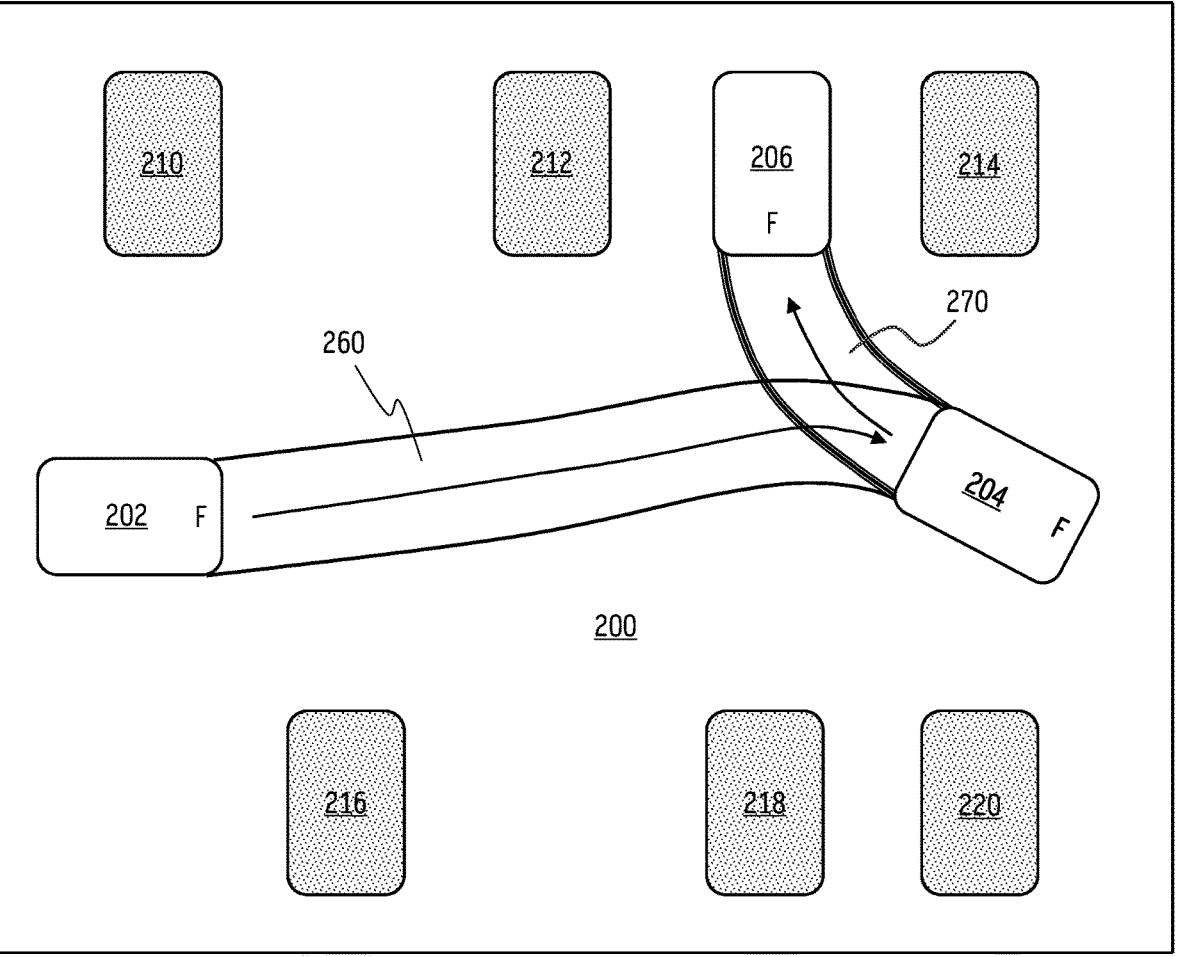
FIG. 2 illustrates an exemplary optimal plan for a vehicle traveling from a current pose to an end pose, according to some aspects of the disclosed technology.

FIG. 2 illustrates an exemplary optimal plan for a vehicle traveling from a current pose to an end pose, according to some aspects of the disclosed technology. Motion planners such as freespace planner 106 of FIG. 1 can produce an optimal plan for a vehicle to navigate from a current pose 202 to an end pose 206. As illustrated, a vehicle may be navigating in area 200, and may have a current pose 202. The letter F indicates a front of the vehicle. The area may have obstacles, marked as shape 210, shape 212, shape 214, shape 216, shape 218, and shape 220. The vehicle may receive a task to drive to or relocate to an end pose 206. The task may be a parking task, e.g., backup/reverse parking the vehicle. The optimal plan to complete the task may avoid obstacles in area 200. Getting from a current pose 202 to end pose 206 may necessitate changing driving directions. The optimal plan may include a first segment 260 involving the vehicle driving forward from a current pose 202 to an intermediate pose 204. The optimal plan may include a second segment 270 involving the vehicle driving in reverse from the intermediate pose 204 to the end pose 206. At intermediate pose 204, the vehicle may change direction or change gears to go in an opposite direction. Intermediate pose 204 may connect the first segment 260 and the second segment 270.

The depicted optimal plan is merely shown as an illustrative example. It is envisioned by the disclosure that an optimal plan for a vehicle to go from a current/starting pose to an end pose may include one or more segments and one or more intermediate poses. An intermediate pose they may connect two segments.

Exemplary Freespace Planner for a Vehicle

Figure 3:
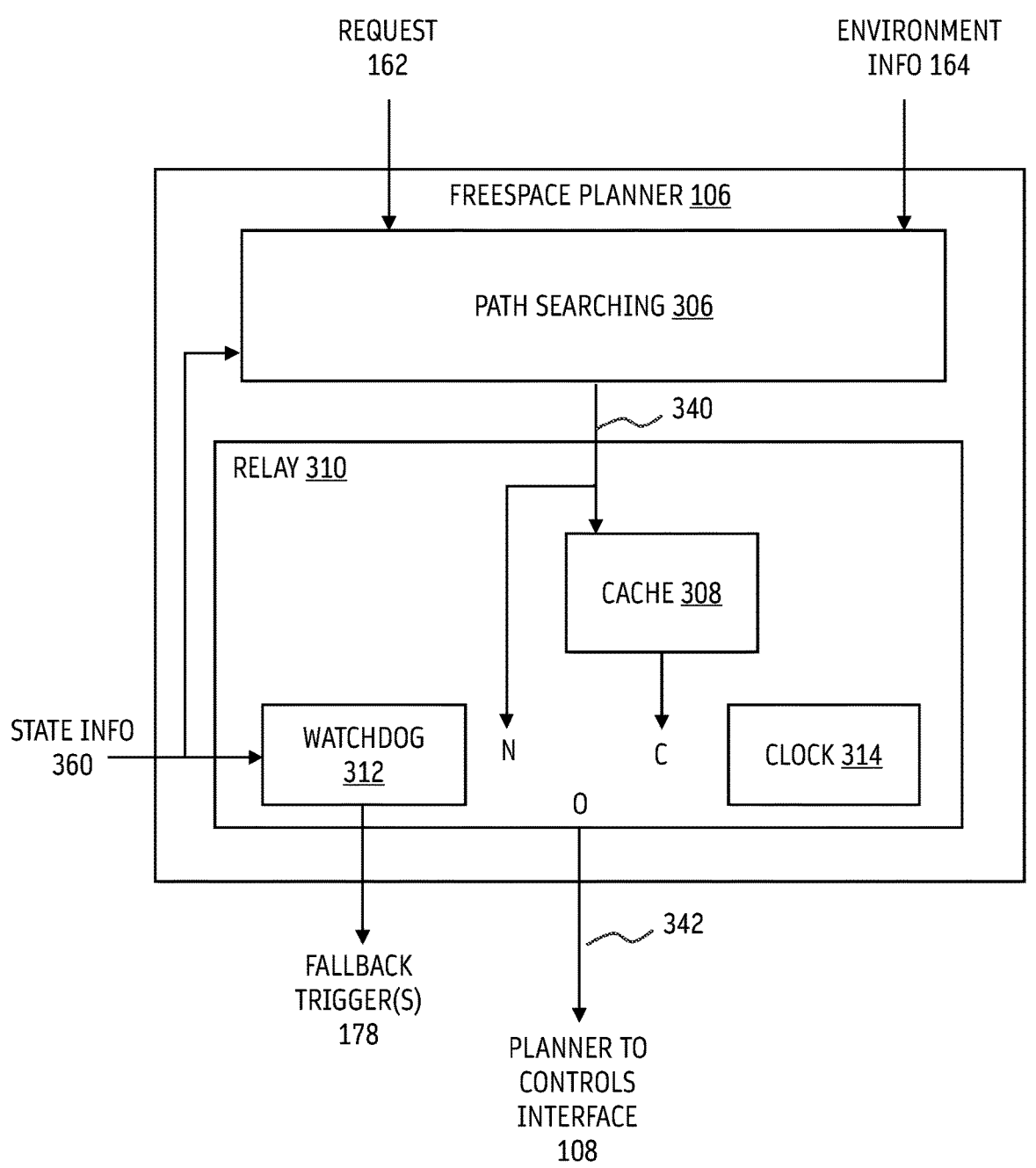
FIG. 3 illustrates an exemplary freespace planner for a vehicle, according to some aspects of the disclosed technology.

FIG. 3 illustrates an exemplary freespace planner 106 for a vehicle, according to some aspects of the disclosed technology. Freespace planner 106 may include path searching 306, and relay 310. Path searching 306 may receive a request 162 to generate one or more plans. The request 162 may be received from a planner manager 110 of FIG. 1 on the vehicle. Request 162 may include a request to compute one or more plans for the vehicle to reach an end pose. Request 162 may include a request to execute the computed plan towards the end pose. Request 162 may include a request for freespace planner 106 to (repeatedly) update, refresh, or output a plan for the vehicle to reach an end pose.

Freespace planner 106 may receive state information 360 about the vehicle. State information 360 may include one or more of:

data about the vehicle, events about the vehicle, active faults or errors the vehicle, current pose of the vehicle, current speed of the vehicle, current acceleration of the vehicle, current gear of the vehicle, current location of the vehicle, position control error of the vehicle, vehicle signal lights state of the vehicle, whether collision is detected or occurred, sensor information about the vehicle, perception information about tracked objects in the surroundings of the vehicle (e.g., whether a special emergency vehicle or a law enforcement vehicle is in the surroundings of the vehicle, tracked objects information, etc.), prediction information about tracked objects in the surroundings of the vehicle, the operational design domain in which the vehicle is operating, whether the vehicle meets one or more requirements of the operational design domain, a number of tracked objects, a number of tracked moving objects, a number of tracked stationary objects, whether the vehicle is in a traffic congestion area, a type of location that the vehicle is in (e.g., indoor, outdoor, within a building structure, on a public road, on a private road or a public road, offroad, in a parking lot, in a parking garage, on a car elevator, in an intersection, not in an intersection, in a conflict zone on the road, on a highway, on a residential street, next to a bus lane, next to a bike lane, etc.), weather conditions that the vehicle is in (e.g., icy, snow, rain, fog, etc.), kinematic constraints of the vehicle (e.g., limitations on feasible turning radius, limitations due to limited traction on the road, etc.), dynamic constraints of the vehicle (e.g., target deceleration profiles, maximum allowable turning radius), road surface conditions that the vehicle is encountering (e.g., icy roads, wet roads, etc.), and road grade that the vehicle is encountering.

Freespace planner 106 may receive environment information 164 for path planning. Environment information 164 may be used by path searching 306 to process request 162. Path searching 306 may perform path planning and may implement a path planning algorithm. In some cases, path searching 306 may be referred to simply as a planner or component that is configured to produce one or more optimal plans. Examples of a path planning algorithm may include, e.g., graph-based search, rule-based search, Dijkstra's algorithm, A* search, Rationally Inattentive Path-Planning Algorithm, (RIPA), Dubins path finder, Reeds-Shepp path finder, path optimization algorithm, Sampling-based algorithm, polynomial planner, or some variation thereof. Path searching 306 may use one or more of: at least a portion of environment information 164, and at least a portion of state information 360 to find an optimal plan 340. Path searching 306 may output the optimal plan. Path searching 306 may update the optimal plan as the input information is updated. Generated optimal plans may be timestamped. Path searching 306 may generate and output timestamped plans 340.

Environment information 164 and/or state information 360 may update at a certain frequency (e.g., 10 Hz). Consumers of the optimal plan 340 may have an expectation that path searching 306 would output or update the optimal plan 340 at the same or similar rate as the update rate of environment information 164 and/or state information 360. Consumers may tolerate some delay, e.g., maximum of 300-400 ms delay. In some cases, path searching 306 may be performing complex path planning (e.g., searching for an optimal plan that involves the vehicle driving forward and in reverse), and can take more time than the amount of delay that is tolerated by the consumers. In some cases, path searching 306 may take a few seconds to find an optimal plan, which may cause a delay that is not tolerated by the consumer of the optimal plan.

Relay 310 may be included in or with freespace planner 106. Relay 310 may ensure that the amount of delay tolerated by consumers is not violated. Relay 310 may receive timestamped plans 340, e.g., from path searching 306. Relay 310 may store a latest (last received, or most recent) timestamped plan in the timestamped plans 340. Relay 310 may store the latest timestamped plan in cache 308 (or a suitable computer-readable non-transitory medium). Cache 308 may store the latest timestamped plan while overwriting the previously stored timestamped plan upon receiving the latest timestamped plan.

Relay 310 may output the latest timestamped plan 342 at a frequency, or at a fixed cadence, or on every tick. The frequency may be equal to or greater than the (minimum) frequency that the consumers of the plan expect to receive a plan (e.g., the latest timestamped plan 342). Relay 310 may include a clock 314 which may tick at the frequency. At each tick, relay 310 may cause the latest timestamped plan 342 stored in cache 308 (denoted as "C") to be passed on as an output of relay 310 (denoted as "O"). As a result, the output of relay 310 may output a plan to one or more consumers at the frequency. From the perspective of the one or more consumers of the plan, a plan is available and would not see a delay that is greater than the tolerated amount of delay. In some cases, relay 310 may output the latest timestamped plan (denoted as "N") upon receipt from path searching 306 or receiving the plan from path searching 306. The latest timestamped plan may be passed on as the output of relay 310 (denoted as "O"). As a result, the output of relay 310 may output a plan to one or more consumers at or above the frequency. From the perspective of the one or more consumers of the plan, a plan is available and would not see a delay that is greater than the tolerated amount of delay.

The latest timestamped plan 342 may be provided to planner to controls interface 108, which may provide the latest timestamped plan 342 to vehicle controls (e.g., vehicle controls 120 of FIG. 1) to control the vehicle actuators based on the latest timestamped plan 342 output by relay 310.

In some cases, relay 310 may implement a watchdog that can monitor the delay of path searching 306. Watchdog 312 may determine a timestamp of the latest timestamped plan (e.g., stored in cache 308, and/or received from path searching 306). Watchdog 312 may determine a current timestamp. Watchdog 312 may determine a difference between a timestamp of the latest timestamped plan and the current timestamp. Watchdog 312 may set a counter zero when a latest timestamped plan is received from path searching 306 at relay 310. Watchdog 312 may increment the counter by 1 every X number of milliseconds until relay 310 receives a (new) timestamped plan from path searching 306. Watchdog 312 may reset the counter to zero when the new timestamped plan is received from path searching 306 at relay 310. The counter may represent a difference between a timestamp of the latest timestamped plan and the current timestamp. Watchdog 312 may determine that the difference and/or the counter crosses a threshold. The threshold may be indicative of an amount of tolerable delay. The threshold, if crossed or exceeded, may indicate that a problem or error has occurred in path searching 306 or in the vehicle. In some cases, the counter may start at a non-zero, positive threshold value and decrement by 1 every X number of milliseconds. When the counter reaches 0, watchdog 312 may determine that the counter crosses a threshold. When a threshold is crossed, watchdog 312 may determine that the delay in generating a plan by path searching 306 is too long, excessive, and/or unacceptable. In response to determining that the difference and/or the counter crosses a threshold, watchdog 312 may raise an error. For example, watchdog 312 may set one or more fallback trigger(s) 178 as active. The error may cause a fallback system (e.g., fallback system 194 of FIG. 1) to output a plan to vehicle controls (e.g., vehicle controls 120) to bring the vehicle gracefully to a safe stop. The plan may cause the vehicle to come to a safe stop or a minimal risk condition as soon as possible and gracefully. Watchdog 312 may log an event. Watchdog 312 may set an alert. Watchdog 312 may log a number of times the threshold has been crossed.

The tolerable amount of delay of path searching 306 in producing a new plan may change or vary depending on the driving scenario and/or the situation that vehicle is in. Raising or throwing an error may not be necessary when the vehicle is stationary. Raising or throwing an error may not be necessary when the vehicle is in a controlled building structure with no uncontrolled traveling agents nearby. The threshold used by watchdog 312 can be dynamic. The threshold can vary/change depending on the driving scenario and/or the situation that vehicle is in. Watchdog 312 may receive state information 360 and can use at least some of state information 360 to set the threshold accordingly. In some embodiments, watchdog 312 may determine the threshold based on one or more of: a state of the vehicle, a speed of the vehicle, a location of the vehicle, whether the vehicle is stationary or not, a gear of the vehicle, a number of tracked moving objects in a surrounding of the vehicle. Watchdog 312, depending on the state information 360, may set the threshold to a higher value (e.g., allowing a delay greater than a second), or set the threshold to a lower value (e.g., allowing a delay less than half a second). Watchdog 312 may infer about the driving scenario and/or situation that the vehicle is in to determine how much delay is acceptable for the given driving scenario and/or situation. Watchdog 312 may apply one or more logic rules on state information 360 to determine a value for the threshold. The following illustrates examples for how to adjust/set the threshold based on state information 360:

In response to determining that a speed of the vehicle is at or near zero, setting the threshold to a higher value (e.g., allowing a delay of 4 seconds), In response to determining that a location of the vehicle or the type of location indicates that the vehicle is on a public road, setting the threshold to a lower value (e.g., allowing a delay of 300 ms), In response to determining that a location of the vehicle or the type of location indicates that the vehicle is a private building structure, setting the threshold to a higher value (e.g., allowing a delay of 5 seconds), In response to determining that a location of the vehicle or the type of location indicates that the vehicle is on a private road, setting the threshold to a higher value (e.g., allowing a delay of 5 seconds), In response to determining that a location of the vehicle or the type of location indicates that the vehicle is in an intersection, setting the threshold to a lower value (e.g., allowing a delay of 200 ms), In response to determining that a right of way information of the vehicle indicates that the vehicle does not have a right of way, setting the threshold to a higher value (e.g., allowing a delay of 3 seconds), In response to determining that a number of tracked moving objects is above a certain number, setting the threshold to a lower value (e.g., allowing a delay of 300 ms), In response to determining that a current gear of the vehicle is a reverse gear, setting the threshold to a lower value (e.g., allowing a delay of 400 ms), In response to determining that a current gear of the vehicle is a reverse gear, setting the threshold to a higher value (e.g., allowing a delay of 4 seconds), In response to determining that road grade is greater than 18%, setting the threshold to a lower value (e.g., allowing a delay of 300 ms), In response to determining that the vehicle is operating in a nighttime operational design domain, setting the threshold to a higher value (e.g., allowing a delay of 5 seconds), In response to determining that the vehicle is on a high speed road, setting the threshold to a lower value (e.g., allowing a delay of 300 ms), In response to determining that a high speed traveling agent is in a surrounding of the vehicle, setting the threshold to a lower value (e.g., allowing a delay of 300 ms), and In response to determining that a special emergency vehicle is in the vehicle's s surroundings, setting the threshold to a higher value (e.g., allowing a delay of 5 seconds).

Aspects described in FIG. 3 may be applicable to other types of planners besides freespace planner 106. The description is not intended to be limited to freespace planner 106.

Figure 4:
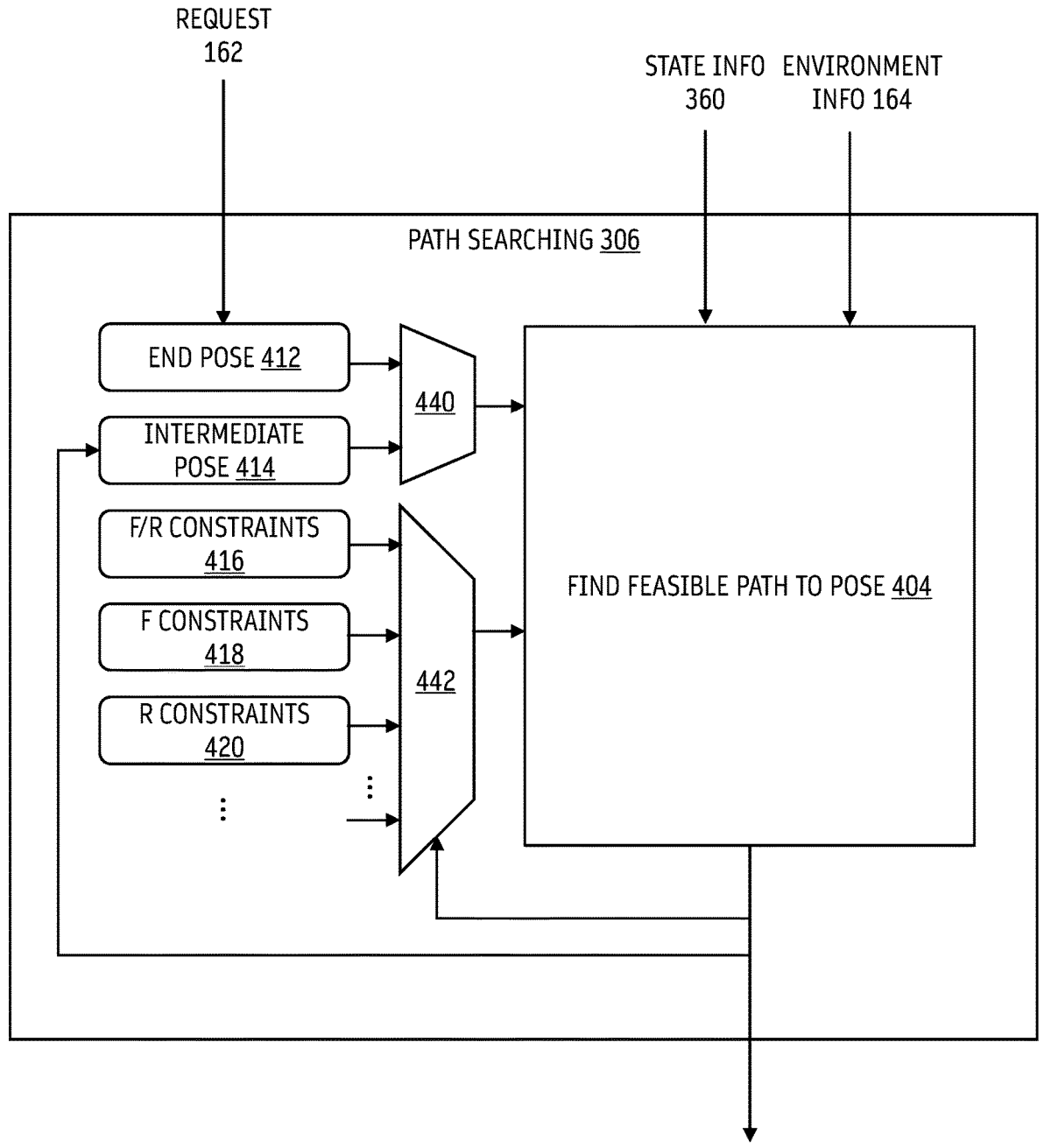
FIG. 4 illustrates path searching in a freespace planner for a vehicle, according to some aspects of the disclosed technology.

FIG. 4 illustrates path searching 306 in a freespace planner 106 of FIGS. 1 and 3 for a vehicle, according to some aspects of the disclosed technology. In some cases, path searching 306 may take a significant amount of time to find an optimal plan. To improve the speed of path searching 306, especially when path searching 306 is updating/refreshing an optimal plan, the search problem may be significantly reduced in complexity once or after a full optimal plan is found. In other words, more constraints or stricter constraints/limitations (e.g., stricter kinematics or kinematic restrictions) can be put on the search space to reduce the search space in subsequent updates or refreshes of the optimal plan, in order to speed up path searching 306. The speed of path searching 306 may be improved by segmenting a full optimal path into multiple segments, and/or by determining one or more intermediate poses which connect two segments. One example of an intermediate pose is when the vehicle is expected to change driving directions (e.g., change gears). Path searching 306 can focus on computing an update to a segment of the full optimal path, one by one, as the vehicle reaches the intermediate poses one by one. Path searching 306 may output (and repeatedly refresh) a subplan for a segment, one by one, for all segments of the full optimal path. Different constraints or limitations may be applied when path searching 306 is computing for the full optimal plan and when path searching 306 is computing an update on a subplan.

When computing a full optimal plan, fewer and/or more relaxed constraints/limitations may be applied to the search space, especially when path searching 306 is not constrained to drive in one direction only, but may be allowed to explore or find a full optimal path which involves the vehicle driving forward and in reverse to reach an end pose. When computing a subplan for a segment, more and/or stricter constraints/limitations may be applied to the search space, including shortening the distance of the subplan to reach an intermediate pose as opposed to the final end pose, and optionally constraining the vehicle to drive in one direction only (thereby limiting exploration during the search). In some cases, when computing or updating the subplan for a segment, the segment may be used as a seed.

Path searching 306 may include find feasible path to pose 404. Find feasible path to pose 404 may implement one or more algorithms for finding an optimal plan from a current pose of the vehicle to an end pose, based on one or more of: state information 360 and environment information 164. Path searching 306 receiving a request 162 to generate a plan to an end pose. The request 162 may include and/or specify end pose 412. Path searching 306 may receive a current pose of the vehicle in state information 360. Path searching 306 may receive environment information 164.

In response to receiving request 162, path searching 306 may trigger find feasible path to pose 404 to find a kinematically and/or dynamically feasible path for the vehicle to reach the end pose 412. A first selector 440 may select end pose 412 as the goal for find feasible path to pose 404. Find feasible path to pose 404 may search, using the current pose, the environment information 164, and one or more first constraints, for a full optimal plan from the current pose to the end pose 412. The one or more first constraints may be constraints/limitations that allow find feasible path to pose 404 to explore plans that involve the vehicle driving both forward and in reverse (depicted as F/R constraints 416). A second selector 442 may select the one or more first constraints (e.g., F/R constraints 416) to be applied in find feasible path to pose 404. Using the one or more first constraints, find feasible path to pose 404 may output a full optimal plan to reach end pose 412.

The full optimal plan determined by find feasible path to pose 404 may include one or more segments and one or more intermediate poses connecting two segments. The full optimal plan determined by find feasible path to pose 404 may include a first segment, a second segment, and an intermediate pose connecting the first segment and the second segment. An exemplary plan is illustrated in FIG. 2.

The first segment may involve the vehicle traveling in a first direction (e.g., driving forward). The second segment may involve the vehicle traveling in a second direction opposite of the first direction (e.g., driving in reverse).

The intermediate pose may include a suitable midpoint of the full optimal plan. The intermediate pose may involve the vehicle changing direction of travel or changing gears. The intermediate pose may involve the vehicle at a stop. The intermediate pose may involve the vehicle at a stop, e.g., before entering an intersection (e.g., a stop sign controlled intersection, a major-minor intersection, a traffic light controlled intersection, a minor-major intersection, a yield sign controlled intersection, a roundabout intersection, etc.). The intermediate pose may involve the vehicle crossing a lane boundary. The intermediate pose may involve the vehicle exiting a first level of a multi-level structure and entering a second level of the multi-level structure.

Upon finding the full optimal plan and determining one or more intermediate poses, find feasible path to pose 404 may search for a subplan from the current pose to a first intermediate pose. Find feasible path to pose 404 may search for a subplan for the first segment to the first intermediate pose. Find feasible path to pose 404 may apply different constraints, such as constraints suited for updating the first segment. Constraint(s) to be used for the first segment can be selected, e.g., based on the direction of travel involved by the first segment, based on the location of the first segment, based on one or more attributes about the first segment, etc.

First selector 440 may select a first intermediate pose 414 as the goal for find feasible path to pose 404. Second selector 442 may select the one or more second constraints to be applied in find feasible path to pose 404. Second selector 442 may select other constraints to be applied, depending on the attributes of the first segment or some other suitable factor. Second selector 442 may select one or more constraints suitable for limiting a search space for a vehicle driving forward only (e.g., F constraints 418) if the first segment involves the vehicle driving forward. Second selector 442 may select one or more constraints suitable for limiting a search space for a vehicle driving in reverse only (e.g., R constraints 420) if the first segment involves the vehicle driving in reverse. The one or more second constraints may include a constraint that may allow unidirectional travel only.

Find feasible path to pose 404 may search, using the current pose of the vehicle, the environment information 164, and the one or more second constraints (different from the first constraints), for a subplan from the current pose to the intermediate pose 414. In some embodiments, the first segment may be used as a seed, a starting point, and/or a constraint for the search for the subplan. Find feasible path to pose 404 of path searching 306 may output the subplan. The subplan may be used by vehicle controls (e.g., vehicle controls 120 of FIG. 1) to control one or more vehicle actuators based on the subplan output by path searching 306. Find feasible path to pose 404 may repeatedly search/update the subplan as the vehicle updates its current pose (refreshed/updated in state information 360), executes the subplan, and travels towards the intermediate pose.

Once the vehicle reaches or is about to reach the intermediate pose, intermediate pose 414 may be updated as the next/subsequent/following intermediate pose in the full optimal plan. First selector 440 may thus select the next/subsequent/following intermediate pose as the goal for find feasible path to pose 404. Second selector 442 may select one or more suitable constraints to be applied in find feasible path to pose 404. Find feasible path to pose 404 may search for a further subplan from the intermediate pose to the next/subsequent/following intermediate pose. In some embodiments, the second segment may be used as a seed, a starting point, and/or a constraint for the search for the further subplan. Find feasible path to pose 404 of path searching 306 may output the further subplan. The further subplan may be used by vehicle controls (e.g., vehicle controls 120 of FIG. 1) to control one or more vehicle actuators based on the further subplan output by path searching 306. Find feasible path to pose 404 may repeatedly search/update the further subplan as the vehicle updates its current pose (refreshed/updated in state information 360), executes the further subplan, and travels towards the next/subsequent/following intermediate pose.

The above searching may be applied to each segment and/or intermediate pose one by one until the vehicle reaches the end pose.

In some cases, the vehicle may not be able to reach an intermediate pose. A planner (e.g., freespace planner 106) may determine that a position control error of the vehicle based on the current pose and the subplan crosses a threshold. In response to the determination, the planner may search, using the current pose, the environment information, for a further plan from the current pose to the end pose. The planner (e.g., find feasible path to pose 404) may search for a new full optimal path from the current pose to the end pose. The process of segmenting the new full optimal path into segments and updating subplans based on the segments (one by one) may be applied until the vehicle reaches the end pose.

Exemplary Relay and Dynamic Watchdog Methods

Figure 5:
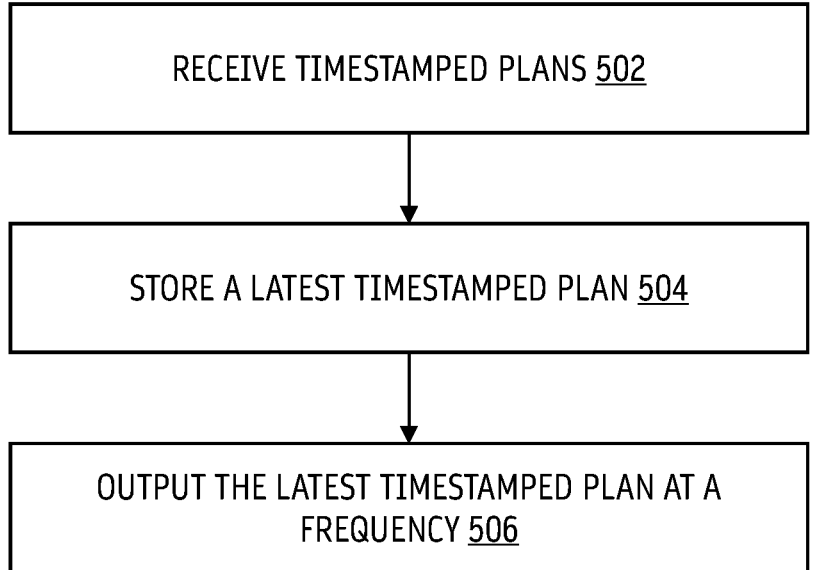
FIG. 5 is a flow diagram illustrating a computer-implemented method performed by a relay, according to some aspects of the disclosed technology.

FIG. 5 is a flow diagram illustrating a computer-implemented method performed by a relay (e.g., relay 310 in FIG. 3), according to some aspects of the disclosed technology. The method may be carried out by and/or implemented in systems such as the AV 890 of FIG. 8 and processor-based system 900 of FIG. 9. In 502, the relay may receive timestamped plans, e.g., from a planner or path searching. In 504, the relay may store a latest timestamped plan. In 506, the relay may output the latest timestamped plan at a frequency. The latest timestamped plan output by the relay may be used by vehicle controls (e.g., vehicle controls 120 of FIG. 1). Vehicle controls may control one or more vehicle actuators based on the latest timestamped plan output by the relay in 508, e.g., to cause the vehicle to execute the latest timestamped plan.

Figure 6:
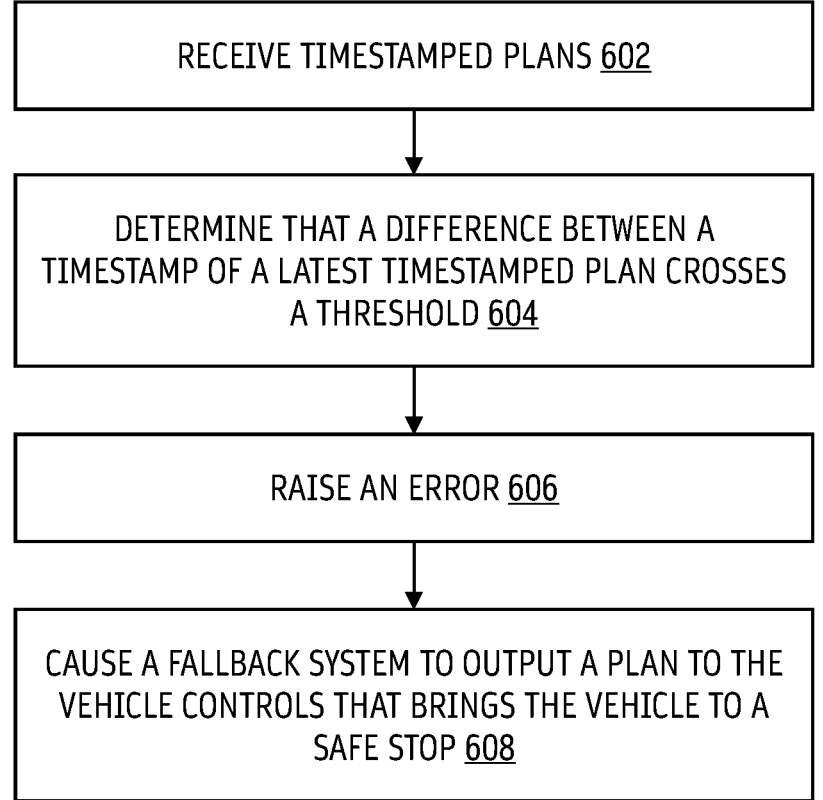
FIG. 6 is a flow diagram illustrating another computer-implemented method performed by a relay, according to some aspects of the disclosed technology.

FIG. 6 is a flow diagram illustrating another computer-implemented method performed by a relay (e.g., relay 310 in FIG. 3), according to some aspects of the disclosed technology. The method may be carried out by and/or implemented in systems such as the AV 890 of FIG. 8 and processor-based system 900 of FIG. 9. In 602, the relay may receive timestamped plans, e.g., from a planner or path searching. In 604, a watchdog of the relay (e.g., watchdog 312 of FIG. 3) may that a difference between a timestamp of the latest timestamped plan and a current timestamp crosses a threshold. In 606, the watchdog may raise an error. In 608, the error may cause a fallback system (e.g., fallback system 194 of FIG. 1) to output a plan to the vehicle controls that brings the vehicle to a safe stop.

Exemplary Freespace Planning Methods

FIG. 7 is a flow diagram illustrating another computer-implemented method performed by a freespace planner (e.g., freespace planner 106 of FIGS. 1 and 3, and path searching 306 of FIGS. 3-4), according to some aspects of the disclosed technology. The method may be carried out by and/or implemented in systems such as the AV 890 of FIG. 8 and processor-based system 900 of FIG. 9. In 702, a planner (or path searching) may receive (1) a request to generate a plan to an end pose, (2) a current pose of the vehicle, and (3) environment information. In 704, the planner may search, using the current pose, the environment information, and one or more first constraints, for a plan from the current pose to the end pose. The plan can include a first segment, a second segment, and an intermediate pose connecting the first segment and the second segment. In 706, the planner may search, using the current pose, the environment information, and one or more second constraints different from the one or more first constraints, for a subplan from the current pose to the intermediate pose. In 708, the planner may output the subplan. The subplan may be used by vehicle controls (e.g., vehicle controls 120 of FIG. 1). Vehicle controls may control one or more vehicle actuators based the subplan output by the planner in 708, e.g., to cause the vehicle to execute the subplan.

Exemplary AV Management System

Figure 8:
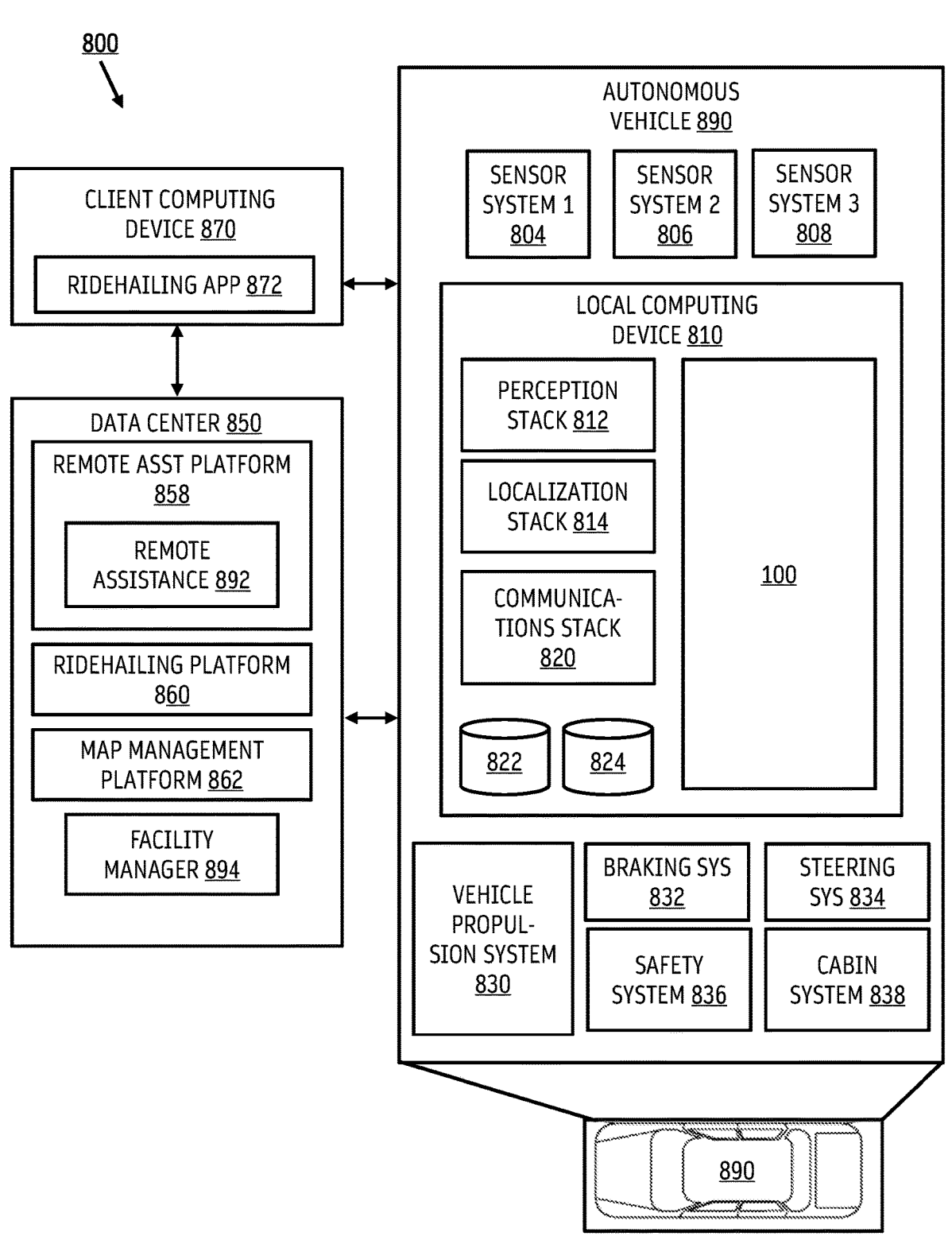
FIG. 8 illustrates an exemplary system environment that may be used to facilitate AV operations, according to some aspects of the disclosed technology.

Turning now to FIG. 8, this figure illustrates an example of an AV management system 800, in which some of the aspects of the present disclosure can be implemented. One of ordinary skill in the art will understand that, for the AV management system 800 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 800 includes a vehicle 890, a data center 850, and a client computing device 870. The vehicle 890, the data center 850, and the client computing device 870 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

Vehicle 890 may navigate about roadways without a human driver based on sensor signals (e.g., referred herein as sensor data source(s)) generated by multiple sensor systems 804, 806, and 808. The sensor systems 804-808 may include different types of sensors and may be arranged about the vehicle 890. For instance, the sensor systems 804-808 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, ultrasonic sensors, capacitive sensors, time-of-flight sensors, pressure sensors, temperature sensors, and so forth. For example, the sensor system 804 may be a camera system, the sensor system 806 may be a LIDAR system, and the sensor system 808 may be a RADAR system. Other embodiments may include any other number and type of sensors.

Vehicle 890 may also include one or more vehicle actuators, including several mechanical systems 830-838 that may be used to maneuver or operate vehicle 890. For instance, the vehicle actuators may include vehicle propulsion system 830, braking system 832, steering system 834, safety system 836, and cabin system 838, among other systems. Vehicle actuators may include vehicle signal lights, vehicle honk, vehicle gear, vehicle doors, etc. Vehicle propulsion system 830 may include an electric motor, an internal combustion engine, or both. The braking system 832 may include an engine brake, a wheel braking system (e.g., a disc braking system that utilizes brake pads), hydraulics, actuators, and/or any other suitable componentry configured to assist in decelerating vehicle 890. The steering system 834 may include suitable componentry configured to control the direction of movement of the vehicle 890 during navigation. Safety system 836 may include lights and signal indicators, a parking brake, airbags, and so forth. The cabin system 838 may include cabin temperature control systems, in-cabin entertainment systems, and so forth. In some embodiments, the vehicle 890 may not include human driver actuators (e.g., steering wheel, handbrake, foot brake pedal, foot accelerator pedal, turn signal lever, window wipers, etc.) for controlling the vehicle 890. Instead, the cabin system 838 may include one or more client interfaces (e.g., GUIs, Voice User Interfaces (VUIs), etc.) for controlling certain aspects of the mechanical systems 830-838.

Vehicle 890 may additionally include a local computing device 810 that is in communication with the sensor systems 804-808, the mechanical systems 830-838, the data center 850, and the client computing device 870, among other systems. The local computing device 810 may include one or more processors and memory, including instructions that may be executed by the one or more processors. Examples of one or more processors may include a CPU, a GPU, a quantum processor, a machine learning processor, an artificial intelligence processor, a neural network processor, an artificial intelligence accelerator, an ASIC, an analog signal processor, an analog computer, a microprocessor, a digital signal processor, a FPGA, a TPU, a DPU, etc. The instructions may make up one or more software stacks or components responsible for controlling the vehicle 890; communicating with the data center 850, the client computing device 870, and other systems; receiving inputs from riders, passengers, and other entities within the AV's environment; logging metrics collected by the sensor systems 804-808; and so forth.

In this example, the local computing device 810 includes a perception stack 812, a mapping and localization stack 814, planning and control system 100, a communication stack 820, a high definition (HD) geospatial database 822, and an AV operational database 824, among other stacks and systems.

Perception stack 812 may enable the AV 890 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 804-808, the mapping and localization stack 814, the HD geospatial database 822, other components of the AV, and other data sources (e.g., the data center 850, the client computing device 870, third-party data sources, etc.). Perception stack 812 may detect and classify objects and determine their current and predicted locations, speeds, directions, and the like. In addition, the perception stack 812 may determine the free space around the AV 890 (e.g., to maintain a safe distance from other objects, change lanes, park the AV, etc.). Perception stack 812 may also identify environmental uncertainties, such as where to look for moving objects, flag areas that may be obscured or blocked from view, and so forth.

Mapping and localization stack 814 may determine the AV's position and orientation (pose) using different methods from multiple systems (e.g., GPS, IMUs, cameras, LIDAR, RADAR, ultrasonic sensors, the HD geospatial database 822, etc.). For example, in some embodiments, the AV 890 may compare sensor data captured in real-time by the sensor systems 804-808 to data in the HD geospatial database 822 to determine its precise (e.g., accurate to the order of a few centimeters or less) position and orientation. The AV 890 may focus its search based on sensor data from one or more first sensor systems (e.g., GPS) by matching sensor data from one or more second sensor systems (e.g., LIDAR). If the mapping and localization information from one system is unavailable, the AV 890 may use mapping and localization information from a redundant system and/or from remote data sources.

Planning and control system 100 may determine how to maneuver or operate the AV 890 safely and efficiently in its environment. For instance, planning and control system 100 may produce a plan for the AV 890, which can include a (reference) trajectory. For example, the planning and control system 100 may receive the location, speed, and direction of the AV 890, geospatial data, data regarding objects sharing the road with the AV 890 (e.g., pedestrians, bicycles, vehicles, ambulances, buses, cable cars, trains, traffic lights, lanes, road markings, etc.) or certain events occurring during a trip (e.g., an emergency vehicle (EMV) blaring a siren, intersections, occluded areas, street closures for construction or street repairs, DPVs, etc.), traffic rules and other safety standards or practices for the road, user input, and other relevant data for directing the AV 890 from one point to another. Planning and control system 100 may determine multiple sets of one or more mechanical operations that the AV 890 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, planning and control system 100 may select from multiple backup plans to carry out. For example, while preparing to change lanes to turn right at an intersection, another vehicle may aggressively cut into the destination lane, making the lane change unsafe. Planning and control system 100 could have already determined an alternative plan for such an event, and upon its occurrence, help to direct the AV 890 to go around the block instead of blocking a current lane while waiting for an opening to change lanes. Planning and control system 100 may manage the operation of the vehicle propulsion system 830, the braking system 832, the steering system 834, the safety system 836, and the cabin system 838. Planning and control system 100 may receive sensor signals from the sensor systems 804-808 as well as communicate with other stacks or components of the local computing device 810 or a remote system (e.g., the data center 850) to effectuate the operation of the AV 890. For example, planning and control system 100 may implement the final path or actions from the multiple paths or actions provided by a planner in planning and control system 100. The implementation may involve turning the plan into commands for vehicle actuators such as the actuators that control the AV's steering, throttle, brake, and drive unit.

The communication stack 820 may transmit and receive signals between the various stacks and other components of the AV 890 and between the AV 890, the data center 850, the client computing device 870, and other remote systems. The communication stack 820 may enable the local computing device 810 to exchange information remotely over a network. Communication stack 820 may also facilitate local exchange of information, such as through a wired connection or a local wireless connection.

The HD geospatial database 822 may store HD maps and related data of the streets upon which the vehicle 890 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 824 may store raw AV data generated by the sensor systems 804-808 and other components of the vehicle 890 and/or data received by the vehicle 890 from remote systems (e.g., the data center 850, the client computing device 870, etc.). In some embodiments, the raw AV data may include HD LIDAR point cloud data, image or video data, RADAR data, GPS data, and other sensor data that the data center 850 may use for creating or updating AV geospatial data.

Data center 850 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 850 may include one or more computing devices remote to the local computing device 810 for managing a fleet of AVs and AV-related services. For example, in addition to managing the vehicle 890, the data center 850 may also support a ridehailing/ridesharing service, a delivery service, a remote/roadside assistance service, street services (e.g., street mapping, street patrol, street cleaning, street metering, parking reservation, etc.), and the like.

The data center 850 may send and receive various signals to and from the vehicle 890 and the client computing device 870. These signals may include sensor data captured by the sensor systems 804-808, roadside assistance requests, software updates, ridehailing/ridesharing pick-up and drop-off instructions, and so forth. In this example, the data center 850 includes one or more of a remote assistance platform 858, a ridehailing/ridesharing platform 860, a map management platform 862, a facility manager 894, among other systems.

The remote assistance platform 858 may generate and transmit instructions regarding the operation of vehicle 890. The remote assistance platform 858 may prepare instructions for one or more stacks or other components of vehicle 890. Remote assistance platform 858 may include remote assistance application 892. Remote assistance application 892 may be used by one or more remote advisors to monitor and remotely relocate vehicles, such as vehicle 890, to selected end poses. Remote assistance application 892 may be a remote requestor that transmit relocation requests to vehicle 890 to generate an optimal plan to reach a selected end pose and cause planning and control system 100 in vehicle 890 to carry out the functionalities described herein.

Facility manager 894 may generate and transmit instructions regarding the operation of vehicle 890. Facility manager 894 may prepare instructions for one or more stacks or other components of the vehicle 890. Facility manager 894 may be used by one or more managers, orchestrator algorithm, and/or scheduling algorithm, to remotely relocate/move an ensemble of vehicles, including vehicle 890, to selected end poses. Facility manager 894 may coordinate or manage movement of the ensemble of vehicles in a parking lot, a maintenance facility, and/or in a building structure. Facility manager 894 may be a remote requestor that transmit relocation requests to vehicle 890 to generate an optimal plan to reach a selected end pose and cause planning and control system 100 in vehicle 890 to carry out the functionalities described herein.

The ridehailing/ridesharing platform 860 may interact with a customer of a ridehailing/ridesharing service via a ridehailing/ridesharing application 872 executing on the client computing device 870. The client computing device 870 may be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridehailing/ridesharing application 872. The client computing device 870 may be a customer's mobile computing device or a computing device integrated with the vehicle 890 (e.g., the local computing device 810). The ridehailing/ridesharing platform 860 may receive requests to be picked up or dropped off from the ridehailing/ridesharing application 872 and dispatch the vehicle 890 for the trip.

Map management platform 862 may provide a set of tools for the manipulation and management of geographic and spatial (geospatial) and related attribute data. A data management platform (not shown) may receive LIDAR point cloud data, image data (e.g., still image, video, etc.), RADAR data, GPS data, and other sensor data (e.g., raw data) from one or more vehicles including vehicle 890, Unmanned Aerial Vehicles (UAVs), satellites, third-party mapping services, and other sources of geospatially referenced data. The raw data may be processed, and map management platform 862 may render base representations (e.g., tiles (2D), bounding volumes (3D), etc.) of the AV geospatial data to enable users to view, query, label, edit, and otherwise interact with the data. Map management platform 862 may manage workflows and tasks for operating on the AV geospatial data. Map management platform 862 may control access to the AV geospatial data, including granting or limiting access to the AV geospatial data based on user-based, role-based, group-based, task-based, and other attribute-based access control mechanisms. Map management platform 862 may provide version control for the AV geospatial data, such as tracking specific changes that (human or machine) map editors have made to the data and to revert changes when necessary. Map management platform 862 may administer release management of the AV geospatial data, including distributing suitable iterations of the data to different users, computing devices, AVs, and other consumers of HD maps. Map management platform 862 may provide analytics regarding the AV geospatial data and related data, such as to generate insights relating to the throughput and quality of mapping tasks. Map management platform 862 may supply geospatial data to remote assistance platform 858 and/or vehicle 890.

Figure 9:
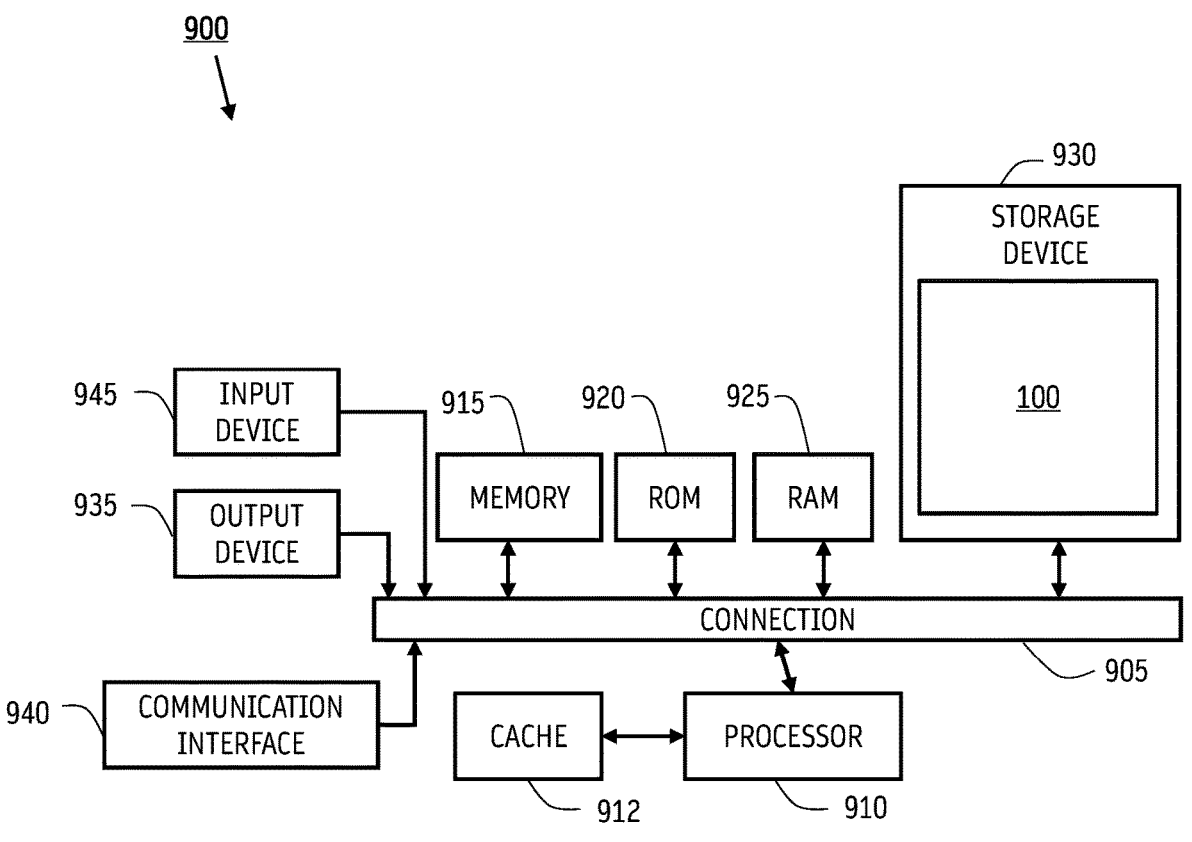
FIG. 9 illustrates an exemplary processor-based system with which some aspects of the subject technology may be implemented.

In some embodiments, the map viewing services of map management platform 862 may be modularized and deployed as part of one or more of the platforms and systems of the data center 850. For example, the remote assistance platform 858 may incorporate the map viewing services for replaying traffic incidents to facilitate and coordinate aid, the ridehailing/ridesharing platform 860 may incorporate the map viewing services into the ridehailing/ridesharing application 872 to enable passengers to view the vehicle 890 in transit enroute to a pick-up or drop-off location, and so on.
Exemplary Processor-Based System FIG. 9 illustrates an example processor-based system with which some aspects of the subject technology may be implemented. For example, processor-based system 900 may be any computing device making up, or any component thereof in which the components of the system are in communication with each other using connection 905. Connection 905 may be a physical connection via a bus, or a direct connection into processor 910, such as in a chipset architecture. Connection 905 may also be a virtual connection, networked connection, or logical connection.

In some embodiments, computing system 900 represents the local computing device 810 of FIG. 8. In some embodiments, one or more of the described system components represents many such components each performing some or all of the function for which the component is described. In some embodiments, the components may be physical or virtual devices.

Exemplary system 900 includes at least one processor 910 and connection 905 that couples various system components including system memory 915, such as Read-Only Memory (ROM) 920 and Random-Access Memory (RAM) 925 to processor 910. Computing system 900 may include a cache of high speed memory 912 connected directly with, in close proximity to, or integrated as part of processor 910. Processor 910 may be a completely self-contained computing system, containing multiple cores or processors, a bus, memory controller, cache, etc. A multi-core processor may be symmetric or asymmetric.

Examples of processor 910 may include a CPU, a GPU, a quantum processor, a machine learning processor, an artificial intelligence processor, a neural network processor, an artificial intelligence accelerator, an ASIC, an analog signal processor, an analog computer, a microprocessor, a digital signal processor, a FPGA, a TPU, a DPU, etc.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms known to those of skill in the art. In some instances, multimodal systems may enable a user to provide multiple types of input/output to communicate with computing system 900. Computing system 900 may include communications interface 940, which may generally govern and manage the user input and system output. The communication interface may perform or facilitate receipt and/or transmission of wired or wireless communications via wired and/or wireless transceivers.

Storage device 930 may be a non-volatile and/or non-transitory and/or computer-readable memory device and may be a hard disk or other types of computer-readable media which may store data that is accessible by a computer. Storage device 930 may include software services, servers, services, etc., that when the code that defines such software is executed by the processor 910, it causes the system 900 to perform a function. Storage device 930 may store executable instructions that implement one or more of: functionalities carried out by components illustrated in FIGS. 1 and 3-4, functionalities illustrated in FIGS. 5-8, and functionalities associated with planning and control system 100. In some embodiments, the instructions that encode a particular function may use the necessary hardware components, such as processor 910, connection 905, output device 935, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Select Examples

Example 1 provides a planning and control system for a vehicle, the planning and control system including a planner to: receive (1) a request to generate a plan for the vehicle to reach an end pose, (2) a current pose of the vehicle, and (3) environment information; search, using the current pose, the environment information, and one or more first constraints, for a plan from the current pose to the end pose, where the plan includes a first segment, a second segment, and an intermediate pose connecting the first segment and the second segment; search, using the current pose, the environment information, and one or more second constraints different from the one or more first constraints, for a subplan from the current pose to the intermediate pose; and output the subplan; and vehicle controls to control one or more vehicle actuators of the vehicle based the subplan output by the planner.

Example 2 provides the planning and control system of example 1, where searching for the subplan further includes using the first segment as a seed.

Example 3 provides the planning and control system of example 1 or 2, where the one or more second constraints impose stricter kinematics on the vehicle than the one or more first constraints.

Example 4 provides the planning and control system of any one of examples 1-3, where: the one or more second constraints allow unidirectional travel only.

Example 5 provides the planning and control system of any one of examples 1-4, where the first segment involves the vehicle traveling in a first direction, and the second segment involves the vehicle traveling in a second direction opposite of the first direction.

Example 6 provides the planning and control system of any one of examples 1-5, where the intermediate pose involves the vehicle changing direction of travel.

Example 7 provides the planning and control system of any one of examples 1-6, where the intermediate pose involves the vehicle at a stop.

Example 8 provides the planning and control system of any one of examples 1-7, where the intermediate pose involves the vehicle at a stop before entering an intersection.

Example 9 provides the planning and control system of any one of examples 1-8, where the intermediate pose involves the vehicle crossing a lane boundary.

Example 10 provides the planning and control system of any one of examples 1-9, where the intermediate pose involves the vehicle exiting a first level of a multi-level structure and entering a second level of the multi-level structure.

Example 11 provides the planning and control system of any one of examples 1-10, where the planner is further to: determine that a position control error of the vehicle based on the current pose and the subplan crosses a threshold; and in response to the determination, search, using the current pose, the environment information, for a further plan from the current pose to the end pose.

Example 12 provides a computer-implemented method, including receiving, by a planner of a vehicle, (1) a request to generate a plan for the vehicle to reach an end pose, (2) a current pose of the vehicle, and (3) environment information; searching, by the planner using the current pose, the environment information, and one or more first constraints, for a plan from the current pose to the end pose, where the plan includes a first segment, a second segment, and an intermediate pose connecting the first segment and the second segment; searching, by the planner using the current pose, the environment information, and one or more second constraints different from the one or more first constraints, for a subplan from the current pose to the intermediate pose; outputting, by the planner, the subplan; and causing vehicle controls to control one or more vehicle actuators of the vehicle based the subplan output by the planner.

Example 13 provides the computer-implemented method of example 12, where: the one or more second constraints allow unidirectional travel only; and the intermediate pose involves the vehicle changing direction of travel.

Example 14 provides the computer-implemented method of example 12 or 13, where searching for the subplan further includes using the first segment as a seed.

Example 15 provides the computer-implemented method of any one of examples 12-14, where the one or more second constraints impose stricter kinematics on the vehicle than the one or more first constraints.

Example 16 provides the computer-implemented method of any one of examples 12-15, further including determining, by the planner, that a position control error of the vehicle based on the current pose and the subplan crosses a threshold; and in response to the determination, searching, by the planner using the current pose, the environment information, for a further plan from the current pose to the end pose.

Example 17 provides a planning and control system for a vehicle, the planning and control system including a planner to generate timestamped plans for a vehicle to reach to reach an end pose; a relay to: receive the timestamped plans; store a latest timestamped plan; output the latest timestamped plan at a frequency; determine that a difference between a timestamp of the latest timestamped plan and a current timestamp crosses a threshold; and raise an error in response to the determination; and vehicle controls to control one or more vehicle actuators of the vehicle based the latest timestamped plan output by the relay.

Example 18 provides the planning and control system of example 17, where the relay is further to: output the latest timestamped plan upon receipt.

Example 19 provides the planning and control system of example 17 or 18, where the relay is further to: determine the threshold based on a state of the vehicle.

Example 20 provides the planning and control system of any one of examples 17-19, where the relay is further to: determine the threshold based on a speed of the vehicle.

Example 21 provides the planning and control system of any one of examples 17-20, where the relay is further to: determine the threshold based on a location of the vehicle.

Example 22 provides the planning and control system of any one of examples 17-21, where the relay is further to: determine the threshold based on a gear of the vehicle.

Example 23 provides the planning and control system of any one of examples 17-22, where the relay is further to: determine the threshold based on a number of tracked moving objects in a surrounding of the vehicle.

Example 24 provides the planning and control system of any one of examples 17-23, where the error causes a fallback system to output a plan to the vehicle controls that brings the vehicle to a safe stop.

Example 25 provides a computer-implemented method, including generating, by a planner of a vehicle, timestamped plans for the vehicle to reach to reach an end pose; receiving, by a relay of the vehicle coupled to the planner, the time-stamped plans; storing, by the relay, a latest timestamped plan; outputting, by the relay, the latest timestamped plan at a frequency; determining, by the relay, that a difference between a timestamp of the latest timestamped plan and a current timestamp crosses a threshold; and raising, by the relay, an error in response to the determination; and causing vehicle controls to control one or more vehicle actuators of the vehicle based the latest timestamped plan output by the relay.

Example 26 provides the computer-implemented method of example 25, further including outputting the latest time-stamped plan upon receipt.

Example 27 provides the computer-implemented method of example 25 or 26, further including determining the threshold based on a state of the vehicle.

Example 28 provides the computer-implemented method of any one of examples 25-27, further including determining the threshold based on a speed of the vehicle.

Example 29 Provides the Computer-Implemented Method of any One of Examples 25-28, Further Including Determine the Threshold Based on a Location of the Vehicle.

Example 30 provides the computer-implemented method of any one of examples 25-29, further including determine the threshold based on a gear of the vehicle.

Example 31 provides the computer-implemented method of any one of examples 25-30, further including determine the threshold based on a number of tracked moving objects in a surrounding of the vehicle.

Example 32 provides the computer-implemented method of any one of examples 25-31, where the error causes a fallback system to output a plan to the vehicle controls that brings the vehicle to a safe stop.

Example 33 provides one or more non-transitory computer-readable media storing instructions that, when executed by one or more processors, cause the one or more processors to perform a method according to any one of examples 12-16 and 25-32.

Example 34 provides a computer system for a vehicle comprising one or more processors and one or more storage devices storing instructions, that when executed, cause the one or more processors to carry out a method according to any one of examples 12-16 and 25-32.

Example 35 provides an apparatus comprising means to carry out or means for carrying out any one of the methods according to any one of examples 12-16 and 25-32.

Example 46 provides a vehicle having one or more vehicle actuators, and a planning and control system according to any one of examples 1-11 and 17-24.

What is claimed is:

1. A planning and control system for a vehicle, the planning and control system comprising: a planner to:
   receive (1) a request to generate a plan for the vehicle to reach an end pose, (2) a current pose of the vehicle, and (3) environment information;
   search, using the current pose, the environment information, and one or more first constraints, for a plan from the current pose to the end pose, wherein the plan includes a first segment, a second segment, and an intermediate pose connecting the first segment and the second segment;
       search, using the current pose, the environment information, and one or more second constraints different from the one or more first constraints, for a subplan from the current pose to the intermediate pose, wherein the one or more second constraints impose stricter kinematics on the vehicle than the one or more first constraints; and
   output the subplan; and
vehicle controls to control one or more vehicle actuators of the vehicle based on the subplan output by the planner.

2. The planning and control system of claim 1, wherein searching for the subplan further comprises using the first segment as a seed.

3. The planning and control system of claim 1, wherein:
   the one or more second constraints allow unidirectional travel only.

4. The planning and control system of claim 1, wherein the first segment involves the vehicle traveling in a first direction, and the second segment involves the vehicle traveling in a second direction opposite of the first direction.

5. The planning and control system of claim 1, wherein the intermediate pose involves the vehicle changing direction of travel.

6. The planning and control system of claim 1, wherein the intermediate pose involves the vehicle at a stop.

7. The planning and control system of claim 1, wherein the intermediate pose involves the vehicle at a stop before entering an intersection.

8. The planning and control system of claim 1, wherein the intermediate pose involves the vehicle crossing a lane boundary.

9. The planning and control system of claim 1, wherein the intermediate pose involves the vehicle exiting a first level of a multi-level structure and entering a second level of the multi-level structure.

10. The planning and control system of claim 1, wherein the planner is further to:
   determine that a position control error of the vehicle based on the current pose and the subplan crosses a threshold; and
   in response to the determination, search, using the current pose, the environment information, for a further plan from the current pose to the end pose.

11. A computer-implemented method, comprising:
   receiving, by a planner of a vehicle, (1) a request to generate a plan for the vehicle to reach an end pose, (2) a current pose of the vehicle, and (3) environment information;
   searching, by the planner using the current pose, the environment information, and one or more first constraints, for a plan from the current pose to the end pose, wherein the plan includes a first segment, a second segment, and an intermediate pose connecting the first segment and the second segment;
   searching, by the planner using the current pose, the environment information, and one or more second constraints different from the one or more first constraints, for a subplan from the current pose to the intermediate pose, wherein the one or more second constraints impose stricter kinematics on the vehicle than the one or more first constraints;
   outputting, by the planner, the subplan; and
   causing vehicle controls to control one or more vehicle actuators of the vehicle based on the subplan output by the planner.

12. The computer-implemented method of claim 11, wherein:
   the one or more second constraints allow unidirectional travel only; and
   the intermediate pose involves the vehicle changing direction of travel.

13. The computer-implemented method of claim 11, wherein searching for the subplan further comprises using the first segment as a seed.

14. The computer-implemented method of claim 11, further comprising:

determining, by the planner, that a position control error of the vehicle based on the current pose and the subplan crosses a threshold; and in response to the determination, searching, by the planner using the current pose, the environment information, for a further plan from the current pose to the end pose.

15. A planning and control system for a vehicle, the planning and control system comprising: a planner to generate timestamped plans for a vehicle to reach to reach an end pose, the planner being configured to generate the timestamped plans by receiving (1) a request to generate a plan for the vehicle to reach an end pose, (2) a current pose of the vehicle, and (3) environment information;

searching, using the current pose, the environment information, and one or more first constraints, for a plan from the current pose to the end pose, wherein the plan includes a first segment, a second segment, and an intermediate pose connecting the first segment and the second segment;

searching, using the current pose, the environment information, and one or more second constraints different from the one or more first constraints, for a subplan from the current pose to the intermediate pose, wherein the one or more second constraints impose stricter kinematics on the vehicle than the one or more first constraints; and outputting the subplan as a timestamped plan;

a relay to:

receive the timestamped plans; store a latest timestamped plan;

output the latest timestamped plan at a frequency;

determine that a difference between a timestamp of the latest timestamped plan and a current timestamp crosses a threshold; and raise an error in response to the determination; and vehicle controls to control one or more vehicle actuators of the vehicle based on the latest timestamped plan output by the relay.

16. The planning and control system of claim 15, wherein the relay is further to:

output the latest timestamped plan upon receipt.

17. The planning and control system of claim 15, wherein the relay is further to:

determine the threshold based on a state of the vehicle.

18. The planning and control system of claim 15, wherein the relay is further to:

determine the threshold based on a speed of the vehicle.

\* \* \* \* \*